June 30, 1964  E. R. MILLS  3,138,985
MEANS FOR PERFORATING PLASTIC FILMS
Filed July 5, 1960
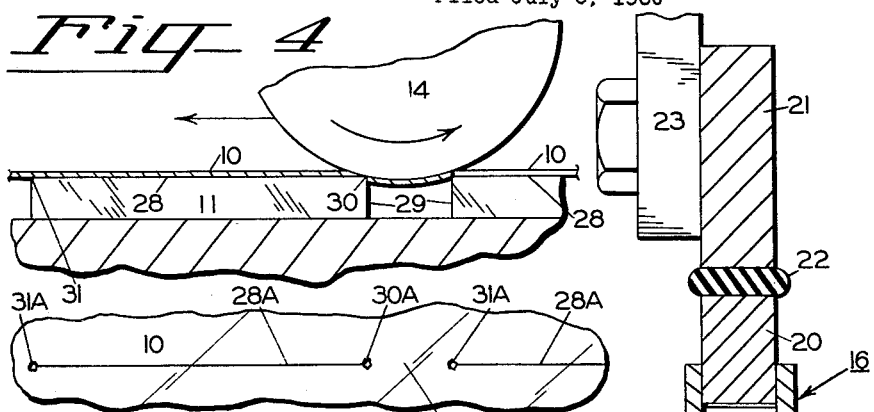
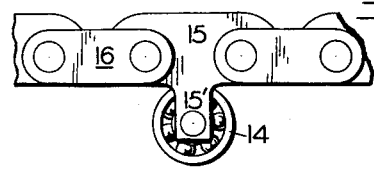
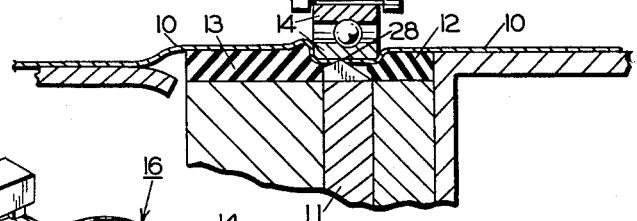
INVENTOR.
EMMETT R. MILLS
ATTORNEY United States Patent Office 3,138,985
Patented June 30, 1964

3,138,985
MEANS FOR PERFORATING PLASTIC FILMS
Emmett R. Mills, 908 5th St., Camas, Wash.
Filed July 5, 1960, Ser. No. 40,723
2 Claims. (Cl. 83—142)

This invention relates in general to the perforating of a web of thin material with rows of perforations extending substantially across the web at predetermined distances along the web.

More specifically, the invention relates to the scoring of such material at predetermined locations with a row of perforations for the purpose of weakening the material along such row so that the material subsequently can be easily severed by manually pulling the material apart along the row. In particular, the present invention is concerned with the scoring or perforating of certain plastic film material, such as polyethylene film and similar plastic films which have recently come into extensive use for wrapping purposes.

Polyethylene, as is well known, has a low stiffness, high elasticity and high tensile strength. These properties produce certain problems in the perforating of polyethylene film. Ordinary perforating devices, when used on polyethylene film, have been found to require excessive maintenance including frequent blade sharpening. Furthermore, polyethylene is relatively easy to tear when a tear has been started or when a cut has been made, and has much less directional tear control than most other sheet materials. Consequently the perforating of polyethylene film in the manner customary with other sheet material, apart from the problem of perforator maintenance, is not very feasible.

The object of the present invention is to provide an improved method of perforating sheet material, together with special means for carrying out the method, which will be particularly suited to polyethylene film or similar plastic film.

Another object of the invention is to provide improved means for perforating polyethylene and similar plastic film which will insure positive perforating while enabling the perforating to take place in a rapid manner.

A further object is to provide a sheet perforator, adapted especially for polyethylene and similar plastic films, which will require a minimum amount of maintenance.

In brief, these objects and other incidental advantages are attained through the forming of a row of perforations in which each perforation consists of an initial puncture of the material with the puncture also serving as the start for a slit, which slit then terminates in a puncture a short predetermined space before the puncture which starts the next successive perforation.

The nature of these special perforations and the way in which they are formed will be explained and described briefly in the following description with reference to the accompanying drawings.

In the drawings:

FIG. 1 is a fragmentary perspective view of one form of the device for perforating the sheet material;

FIG. 2 is a fragmentary section on line 2—2 of FIG. 1 drawn to an enlarged scale;

FIG. 3 is a fragmentary elevation taken on the line indicated at 3—3 of FIG. 1 drawn to a larger scale;

FIG. 4 is a diagrammatic fragmentary elevation illustrating the manner in which the perforations are made; and FIG. 5 is a corresponding enlarged fragmentary view showing the resulting perforation in the sheet.

In the particular form of the device illustrated by the drawings the sheet 10 to be perforated moves over the special anvil bar 11 presently described. The means for moving the sheet 10 through the device together with the control means by which the travel of the sheet is halted at regular predetermined intervals in order to allow a row of perforations to be made across the sheet at desired intervals, are not shown since such means are well known and form no part of the present invention.

The sheet, when moving past the anvil bar 11, is kept from actual contact with the anvil bar by suitable means, such as the resilient strips 12 and 13 (FIG. 2) on opposite sides of the anvil bar in the path of the moving sheet.

When the travel of the sheet is momentarily halted for the purpose of having the desired row of perforations made across the sheet, the sheet is pressed against the anvil bar by a wheel or roller 14 which moves across the sheet in contact with the opposite face of the sheet. The wheel or roller 14, which preferably is of the ball-bearing type, is mounted on a pair of arms 15' formed integrally on a pair of side links 15 of an endless sprocket chain 16.

In the form of the device illustrated, in which the anvil bar 11 is positioned below the sheet 10, the sprocket chain passes over an upper drive sprocket 17 and around a pair of idler sprockets 18 and 19 located near the opposite ends of a combined guide bar and pressure bar 20, the chain 16 travelling along the underside of this pressure bar 20. Thus, when the sprocket 17 drives the chain 16 the roller 14 presses the sheet down against the anvil bar, as illustrated in FIG. 2, while the roller moves across the sheet, and the pressure bar 20 holds the bottom course of the chain against the resulting upward thrust.

The pressure bar 20 preferably is mounted on a backing bar 21 (FIG. 2) and preferably attached to the backing bar through the intermediary of a bonded strip 22 of resilient material, which enables relatively uniform pressure to be maintained by the roller 14 against the sheet and anvil bar during the passage of the roller across the sheet. The backing bar 21 in turn preferably is adjustably mounted on the frame of the device. For example, as illustrated in FIG. 1, the backing bar 21 may be secured to a pair of support brackets 23 which are carried on an upper frame member 24 and are secured to this frame member by clamping screws 23' while adjustment of the brackets 23 is provided by pressure adjustment screws 25.

In the device as illustrated in FIG. 1 a pair of identical rollers 14 are mounted on the chain 16, spaced at half a chain length apart. The number of sheet-engaging rollers may of course be varied depending upon the length of the chain 16 and the relative width of the sheet to be perforated, the spacing between the rollers necessarily of course being somewhat greater than the width of the sheet.

A limit switch assembly 26 is mounted on the device in such position as to be actuated by a roller after the roller has travelled across the sheet. The drive sprocket 17 is driven from a motor M through the intermediary of an electric clutch and brake assembly 27 of well known construction. The means (not shown) for moving the sheet through the device is periodically halted by a master control switch (not shown) which operates the clutch to cause the chain 16 to be driven until the contacting of the limit switch assembly 26 by a roller causes the clutch to be disconnected for a predetermined period and the sheet moving means thereafter to start operating. The electrical circuits and controls are not shown since they are of well known design and do not constitute part of the invention. As the roller 14 moves across the sheet, causing the perforations to be formed on the sheet, the sheet is immediately released from engagement with the anvil bar by the guide strips 12 and 13 (FIG. 2) so that no scuffing of the sheet by the anvil bar occurs when the sheet again resumes its travel through the device.

The anvil bar 11 is formed with a succession of identical beveled knife edges 28 (FIG. 4) separated by notches 29. The length of the notches 29 is made less than the length of the knife edges 28 since the notches in the anvil determine the portions of the sheet between the perforations which are not severed in the perforating process. The length of a knife edge correspondingly determines the length of each perforation. While the length and spacing of the separate perforations may of course be varied, it has been found very satisfactory, in forming rows of perforations in polyethylene film, to have each perforation one-eighth of an inch in length with the spacing between each perforation one-thirty-second of an inch. A satisfactory size for the roller 14 under such circumstances would be a roller with an external diameter of three-quarters of an inch.

As previously indicated, the anvil bar 11 on one side of the sheet and the pressure bar 20 on the opposite side of the sheet are so positioned and the spacing between them so adjusted that, when the roller 14 moves across the sheet it will bear down against the anvil bar and the interposed sheet, as illustrated in FIG. 2. The resulting action which takes place can best be described with reference to FIG. 4. When the roller 14 moves over the sheet 10 and the anvil bar 11 (from right to left, for example, as illustrated in FIG. 4) the roller impinges against each excessive knife edge 28 and the interposed sheet first at the forward corner 30 of the knife edge. In moving over the preceding notch 29 the roller presses the sheet down slightly into the notch, but, due to the low stiffness, high elasticity and high tensile strength of the sheet, no striation in the sheet or no weakening of the sheet or even permanent deforming of the sheet will occur at the notch 29. However, when the roller strikes the corner 30 of the knife edge, an actual puncturing of the sheet will occur at this point. Then, with the movement of the roller along the knife edge 28, a cut will be started in the sheet beginning with this puncture. This cut may continue for the full length of the knife edge, or, in some instances, it may continue only part way along the knife edge and then develop into a striation and weakening of the sheet during the remaining extent of the knife edge. In any event, when the roller reaches the corner 31 at the end of the knife edge and presses down into the next successive notch 29 another definite puncturing of the sheet will occur.

The effect of this action of the roller in cooperation with the corners and knife edge of each knife portion of the anvil bar 11 and adjoining notches is illustrated to a somewhat exaggerated extent in FIG. 5. Thus each resulting perforation of the sheet starts with a puncture 30A, continues as a slit 28A (or partial slit and continuing striation), and terminates in a second puncture 31A.

Due to the fact that a plastic film, such as polyethylene, is very easy to tear when a cut or tear has once been started, a series of ordinary knife cuts in such a sheet, (assuming that the making of such cuts would be feasible), would cause the uncut portions between the knife cuts to be so easily torn that any careless handling of the sheet or any moderate strain on the perforated sheet would be likely to cause undesired opening and separation of the sheet along the scored line. With the method of the present invention, however, the puncture 30A at one end and the puncture 31A at the other end of the cut, or partial cut and striation, have a tendency to restrict the separation of the sheet under ordinary conditions to the line 28A and to resist the extension of the cut to the portions 29A of the sheet corresponding to the notches 29 in the anvil bar. Each puncture acts to limited extent to restrict the severance of the sheet therefore to this portion 28A until added separating pull is applied to the sheet for the purpose of severing the sheet. The principle here involved resembles the principle of stopping cracks in steel plates and other materials by drilling a hole at the end of the crack so as to prevent the crack from continuing.

In addition to giving greater strength to the perforated area in the sheet as previously explained, the initial puncture 30A in the perforating operation is a considerable aid in starting each cut or perforation. The puncturing of the sheet at the corner of the knife brings the roller and knife edge of the anvil bar into metal to metal contact with only a minimum of the sheet area then exposed to the slitting operation. The initial puncture furthermore enables the slit to be started with less actual pressure between the roller and the knife edge than would otherwise be required.

In the illustrations the anvil bar 11 is shown as positioned beneath the sheet and the chain 16 and roller or rollers correspondingly are located above the sheet. Obviously the invention can be carried out equally satisfactorily if the position of these elements is reversed. Other modifications also would be possible in the device described without departing from the principle of the invention or from the scope of the claims.

I claim:

1. In a device for producing a scoring line in plastic film material of the type described, wherein the plastic film is momentarily held stationary while the scoring line is being made, a stationary anvil positioned for contact with one face of the plastic film, said anvil having a series of aligned, spaced, single cutting blades, each blade consisting of a straight knife edge terminating in a sharp corner at each end, a cooperating hard-surfaced roller positioned for contacting said anvil and the opposite face of said plastic film, means for moving said roller along said anvil and said interposed plastic film, and means causing said roller to press against said knife edges of said blades and to strike against said corners of said blades in succession and as said roller moves along said anvil, whereby the engagement of said roller with said blade corners and the interposed plastic film will cause puncturing of said plastic film at said corners and facilitate the scoring and cutting of said plastic film along said knife edges.

2. In a device for producing a scoring line in plastic film material of the type described, wherein the plastic film is momentarily held stationary while the scoring line is being made, a stationary anvil mounted below the plastic film, said anvil having a series of aligned, spaced, single cutting blades, each blade consisting of a straight knife edge terminating in a sharp corner at each end, a cooperating, hard-surfaced roller positioned for contacting said anvil and the top face of said plastic film, means for moving said roller along said anvil and the interposed plastic film, means causing said roller to press down against said knife edges of said blades and to strike against said corners of said blades in succession as said roller moves along said anvil, whereby the engagement of said roller with said blade corners and said interposed plastic film will cause puncturing of said plastic film at said corners and facilitate the scoring and cutting of said plastic film along said knife edges, and resilient means positioned adjacent said blades holding said film above said blades except when said plastic film is contacted by said roller.

References Cited in the file of this patent

UNITED STATES PATENTS

| 472,715 | Rogowski | Apr. 12, 1892 |
| 2,302,571 | Ray | Nov. 17, 1942 |
| 2,333,675 | Randolph | Nov. 9, 1943 |
| 2,517,189 | Fitterling | Aug. 1, 1950 |
| 2,630,175 | Dickerman | Mar. 3, 1953 |
| 2,772,736 | Campbell | Dec. 4, 1956 |
| 2,936,664 | Myers | May 17, 1960 |

FOREIGN PATENTS

| 6,432 | Great Britain | Apr. 16, 1884 |
| 819,802 | Germany | Nov. 5, 1951 |